(12) United States Patent
Brown (10) Patent No.: US 6,719,835 B2
(45) Date of Patent: Apr. 13, 2004

(54) SAND CASTING FOUNDRY COMPOSITION AND METHOD USING SHALE AS ANTI-VEINING AGENT

(75) Inventor: Richard K. Brown, Billings, MT (US)

(73) Assignee: Wyo-Ben, Inc., Billings, MT (US)

( * ) Notice: Subject to any disclaimer, the term of this patent is extended or adjusted under 35 U.S.C. 154(b) by 13 days.

(21) Appl. No.: 10/290,750

(22) Filed: Nov. 8, 2002

(65) Prior Publication Data

US 2003/0101907 A1 Jun. 5, 2003

Related U.S. Application Data (60) Provisional application No. 60/332,679, filed on Nov. 14, 2001.

(51) Int. Cl.[7] .............................. C08K 3/34; B22C 1/00; B22C 1/02; B22C 3/00; B28B 7/36
(52) U.S. Cl. ................. 106/38.2; 523/139; 524/492; 164/520; 164/523; 427/215; 427/221
(58) Field of Search ................. 106/38.2; 427/215, 427/221; 164/520, 523; 523/139; 524/492

(56) References Cited

U.S. PATENT DOCUMENTS

| | | |
|---|---|---|
| 821,718 A | 5/1906 | Janitschek |
| 1,053,787 A | 2/1913 | Conard |
| 1,571,014 A | 1/1926 | Lehr |
| 2,687,966 A | 8/1954 | Miner et al. |
| 2,813,035 A | 11/1957 | Sauter et al. |
| 2,818,620 A | 1/1958 | Moore |
| 2,828,214 A | 3/1958 | Myers et al. |
| 2,848,338 A | 8/1958 | Johnson |
| 3,793,284 A | 12/1971 | Klaudinyi et al. |
| 4,106,945 A | 8/1978 | Erndt |
| 4,216,133 A | 8/1980 | Johnson et al. |
| 4,735,973 A | 4/1988 | Brander |
| 4,778,527 A * | 10/1988 | Ikunaga et al. ............... 264/42 |
| 5,094,289 A | 3/1992 | Gentry |
| 5,275,114 A | 1/1994 | Hughes |
| 5,372,636 A | 12/1994 | Gray et al. |
| 5,695,554 A | 12/1997 | Landis |
| 5,911,269 A | 6/1999 | Brander et al. |
| 5,962,567 A | 10/1999 | Geoffrey et al. |
| 2003/0150592 A1 * | 8/2003 | LaFay et al. ............... 164/523 |
| 2003/0158290 A1 * | 8/2003 | LaFay et al. ............... 523/139 |

FOREIGN PATENT DOCUMENTS

| | | |
|---|---|---|
| DE | 1198495 | 8/1965 |
| DE | 1558109 | 3/1970 |
| FR | 1442361 | 5/1966 |
| JP | 4513561 | 5/1970 |
| JP | 55130358 | 10/1980 |
| JP | 5614049 | 2/1981 |
| JP | 56148437 | 11/1981 |
| RU | 223260 | 11/1968 |
| RU | 0582039 | 11/1977 |
| RU | 979017 | 12/1982 |

OTHER PUBLICATIONS

*Expansion Characteristics of Silica Sands—Part 1 of 3*, University of Northern Iowa, Metal Casting Center, Department of Industries Technology, articles web site, 2 pages (www.mcc.uni.edu), (no date).

*Dehydration, Rehydration, and the Changes Taking Place on Heating*, Clay Mineralogy, Second Edition, Ralph E. Grim, pp. 284–285 (no date).

* cited by examiner

Primary Examiner—Michael Marcheschi
(74) Attorney, Agent, or Firm—John B. Ley (57) ABSTRACT

A sand casting foundry composition reduces thermal defects that cause veining in metal parts cast from sand casting foundry shapes formed from the foundry composition. A plurality of foundry sand grains are mixed substantially uniformly with a plurality of shale particles, and a curable binder coats the sand grains and the shale particles to establish core and mold foundry shapes used to cast the metal part. Anti-veining capability occurs because the shale particles include mineral components which have an inherent characteristic of crystal structural collapse upon exposure to metallurgical temperatures, and the crystal structural collapse yields space which is consumed by thermal expansion of the sand grains in the foundry composition. This compensatory effect avoids the creation of mechanical forces and stresses within the foundry shape that cause cracks and fissures in the foundry shape that lead to veining.

38 Claims, 3 Drawing Sheets

SAND CASTING FOUNDRY COMPOSITION AND METHOD USING SHALE AS ANTI-VEINING AGENT

CROSS-REFERENCE TO RELATED U.S. APPLICATION

This invention and application is related to and claims the benefit of U.S. Provisional application titled "Method for Producing Foundry Shapes," Serial No. 60/332,679, filed Nov. 14, 2001, of which the present applicant is an inventor. The subject matter of this provisional patent application is incorporated herein by this reference.

FIELD OF THE INVENTION

This invention relates to foundry techniques used to create sand cast metal parts. More particularly, the present invention relates to a new and improved sand casting foundry composition and method using shale as an anti-veining agent to prevent veining defects in the cast metal parts.

BACKGROUND OF THE INVENTION

Sand casting is a process used in the foundry industry to produce cast parts. In sand casting, disposable foundry shapes are made by forming a sand-based foundry composition into predetermined configurations and curing the composition to preserve those foundry shapes. A binder in the foundry composition maintains the predetermined configuration of the foundry shape. The foundry shape which defines the exterior of the resulting cast part, known as a mold, is positioned relative to the foundry shape which defines the interior of the cast part, known as a core. With the mold and the core foundry shapes oriented as desired, molten metal is poured between them. The foundry shapes confine the molten metal while it cools and solidifies into the resulting cast part.

The binder must have the capability to preserve the predetermined configurations of the mold and core foundry shapes while those foundry shapes are oriented in the appropriate relationship to create the cast parts and during the time while the molten metal solidifies into the cast part. The typical type of foundry sand used for this purpose is silica sand, although other useful foundry sands include chromite, zircon and olivine sands. Two basic types of binders are commonly employed: inorganic binders, such as clay; and chemical binders, such as phenolic resin binders.

The most widely used inorganic binder for a sand-based foundry composition is bentonite clay. The foundry composition of the sand and bentonite clay binder is referred to as green sand. Green sand is a water tempered sand mixture having plasticity. A green sand foundry composition is typically formed by mulling silica sand, bentonite and a small amount of tempering water. The tempering water allows the bentonite to become sufficiently plastic so that it may be smeared relatively uniformly and thinly over the sand grains during the mulling process. The thin coating of the bentonite on each sand grain interacts with the thin coating on the adjacent sand grains causing the sand grains to be held in place in the mold and core foundry shapes. Green sand molding is economical and is widely used to cast ferrous as well as non-ferrous metal parts. Green sand molding permits high quantity, high quality foundry production, particularly for smaller cast parts.

Chemically-bonded, sand-based foundry compositions use a variety of polymerizable or curable organic and inorganic resin binders to hold the sand grains together in the desired mold or core shape. Chemical bonding involves mixing the sand and a polymerizable or curable binder. Once the mixture of the sand grains and the uncured binder have been shaped into the desired configuration, the chemical binder is polymerized or cured by the addition of a catalyst and/or heat, resulting in converting the shaped configuration into hard, solid, cured mold or core foundry shapes. Examples of curable resin binders include phenolic and furan resins. In a typical no-bake process, i.e. one which does not involve the addition of heat for curing, the sand, binder, and a liquid curing catalyst are mixed and compacted to produce the desired configurations of the mold or core foundry shapes. A commonly used no-bake binder is a polyurethane binder, derived by curing a polyurethane forming binder material with a liquid tertiary amine catalyst.

When subjected to the heat of the molten metal, the sand grains in mold and core foundry shapes expand. If the sand grains in the molds and cores are too close together, the sand grains expand in size and push on the adjacent sand grains. The thermal expansion opens up small cracks and fissures in the molds and cores, and the molten metal penetrates into those cracks and fissures. When the molten metal solidifies, raised, narrow ridges on the surfaces of the cast part result at those locations where the molten metal penetrated into the small cracks and fissures. The resulting narrow ridges are referred to as "veins" or "veining." The veining may make it necessary to surface grind or machine away the projecting veins. Of course, such surface grinding or machining increases the cost of producing the cast part.

Another type of foundry shape defect is caused by gas formation, particularly within core foundry shapes. Water in green sand casting foundry compositions will volatilize into steam in the presence of the hot molten metal. Trapped steam may cause pin holes or cracks in the foundry shape, resulting in the metal penetration into the foundry shape. The gas may also create an uneven or discontinuous surface in the cast part. Gas pressure also results from the volatilization of certain chemical constituents in foundry compositions. It is desirable to use chemical binders which are not susceptible to excessive volatilization, particularly in core foundry shapes.

Expansion and cracking from gas pressure is more of a problem in core foundry shapes, because core foundry shapes are typically surrounded by the molten metal due to their internal position. Those binders which produce significant amounts of gas when exposed to metallurgical temperatures may only be used in foundry shapes where the confined gas has an avenue to escape, otherwise the gas itself may induce cracks, fissures and pin holes. Mold foundry shapes are exposed to the ambient atmosphere and therefore provide avenues for the gas pressure to escape, although the gas pressure may nevertheless create defects in mold foundry shapes. To avoid excessive gas creation where a clay binders is used, the amount of tempering water used to activate the clay binders and allow it to be smeared over the sand grains is limited.

A wide variety of different agents have been added to sand casting foundry compositions in an attempt to improve the properties of core and mold foundry shapes to avoid veining and other casting defects. These additives, known generically as anti-veining agents, include starch based products, dextrin, fine ground glass particles, red talc and wood flour, i.e. particles of wood coated with a resin, granular slag, pulverized sea-coal, alkaline earth or alkaline metal fluoride, and lithia-containing materials, among many other things. Iron oxide, including red iron oxide, also known as hematite ($Fe_2O_3$), black iron oxide, also known as magnetite ($Fe_3O_4$), yellow ochre, and Sierra Leone concentrate, is also another widely used antiveining agent.

Each of these anti-veining agents are theorized to function in a different way to avoid or reduce the incidence of cracks, fissures and the other defects in the foundry shapes which cause veining. It is generally believed that the iron oxides increase the hot plasticity of the sand mixture by the formation of a glassy layer between the sand grains. The glassy layer deforms without fracturing at metallurgical temperatures, to prevent fissures in the foundry shapes. Grains of slag are thought to become soft at metallurgical temperatures permitting the sand grains to expand. Sea-coal and other combustible anti-veining agents are believed to form volatile gas at metallurgical temperatures leaving void space into which the sand grains expand.

SUMMARY OF THE INVENTION

The present invention relates to the use of particles of shale as an anti-veining agent in a sand casting foundry composition used to create foundry shapes for casting metal parts. Phyllosilicate mineral components of the shale particles will undergo crystal structural collapse when the foundry shape is heated by the molten metal during casting. With a sufficient concentration or volumetric quantity of shale particles distributed within the foundry shape, and with sufficient sizes of the shale particles, the collapse of the crystal structure of the phyllosilicate mineral components of each shale particle will cause the shale particles to yield space within the foundry shape sufficient to compensate for the thermally-induced physical expansion of the sand grains. The net result is a negligible change in volume of the foundry shape during heating, thereby avoiding the mechanical forces which cause cracks and fissures in the foundry shape that result in veining.

The volumetric quantity of the shale particles necessary to yield the physical volume sufficient to compensate for the physical expansion of the sand grains may be achieved by using a relatively larger number of relatively smaller physically-sized particles or a relatively smaller number of relatively larger physically-sized particles in the foundry composition. An advantage of using a relatively smaller number of relatively larger sized particles is that less resin binder is consumed by the shale particles. Resin binder is added to and mixed with the mixture of the sand grains and shale particles to form the foundry composition. Since resin binder is expensive, it is important to limit the quantity used to the smallest amount necessary to achieve adequate tensile strength of the foundry shapes to resist breakage or deformation when the foundry shapes are positioned to cast the metal part and while confining the molten metal as its solidifies into the cast part. More surface area is exhibited by a larger number of smaller sized particles as compared to a smaller number of larger sized particles which occupy the same volumetric space. The amount of resin binder consumed is directly related to the surface area of the particles which must be coated with that resin binder, and it is for this reason that a relatively fewer number of relatively larger sized shale particles is preferred.

The shale particles include accessory mineral components which are distributed throughout each particle and are interspersed with the collapsible crystal phyllosilicate mineral components. The accessory mineral components are preferably harder than the collapsible crystal phyllosilicate mineral components in the shale particles. The preferred harder accessory mineral components give the shale particles structural strength and durability to substantially resist disintegration into smaller particles when the shale particles are mixed with the sand grains to form the foundry composition. Consequently, using the preferred durable shale particles in the foundry composition preserves the advantage of using less resin binder in the foundry composition.

The accessory mineral components within the preferred type of shale particles also substantially reduce the porosity and increase the impermeability of the shale particles within the foundry composition. The preferred reduced porosity and increased impermeability also makes the shale particles less sorptive of resin binder. The preferred harder and more durable accessory mineral components of the shale particles also avoid creating significant reductions in tensile strength of the foundry shape when bound by the resin within the matrix of sand grains compared to other currently used anti-veining agents.

These and other improvements are obtained in a number of different forms of the present invention. A sand casting foundry composition reduces thermal defects that cause veining in metal parts cast from sand casting foundry shapes formed from the foundry composition. Such a foundry composition comprises a plurality of foundry sand grains, a plurality of shale particles substantially uniformly distributed throughout the sand grains to form a matrix of sand grains and shale particles, and a curable binder coating the sand grains and the shale particles to hold sand grains and shale particles in position within the matrix upon curing. A method of making the foundry composition involves mixing a plurality of foundry sand grains with a plurality of shale particles to form a mixture in which the shale particles are substantially uniformly distributed within the sand grains in the mixture, and coating the mixture of sand grains and the shale particles with a binder sufficient to hold sand grains and shale particles in position relative to one another after curing of the binder. A method of making a foundry shape from the foundry composition involves mixing a plurality of foundry sand grains with a plurality of shale particles to form a mixture in which the shale particles are substantially uniformly distributed among the sand grains in the mixture, coating the mixture of sand grains and shale particles with a binder sufficient to hold sand grains and shale particles in place relative to one another after curing of the binder, shaping the binder-coated mixture into a predetermined configuration of the foundry shape, and curing the binder while maintaining the predetermined configuration. A method of casting a metal part using core and mold foundry shapes formed in this manner involves positioning the core and mold foundry shapes relative to one another to define the metal part to be cast, pouring molten metal in the space between the core and mold foundry shapes, and solidifying the molten metal while confined between the core and mold foundry shapes.

These aspects of the invention may also be supplemented by further preferable improvements. The shale particles are selected to have a phyllosilicate mineral component with a crystal structure which inherently collapses upon exposure to the temperature created by molten metal used in casting the metal part. Upon collapse, volumetric space is yielded by the shale particles to compensate for and counterbalance the additional volumetric space consumed by the thermal expansion of the sand grains, thereby avoiding the creation of mechanical forces and stresses within the foundry shape that lead to veining. The crystal structural collapse is preferably achieved by phyllosilicate mineral components of the shale particle which have a crystal structure that collapses in response to the elevated temperatures caused by the molten metal. The volumetric concentration and size of shale particles determines the desired yield volume to compensate for the thermal expansion of the sand. The binder is preferably added after the sand grains and shale particles have been mixed, thereby facilitating the homogenous distribution of the shale particles among the sand grains while evenly coating the sand grains and shale particles sufficiently to hold them together in the predetermined desired foundry shape. This sequence of addition will use less binder that if the binder is added before the sand grains and the shale particles have been mixed together. There are many other desirable improvements described herein which may be practiced with the different aspects of the present invention.

A more complete appreciation of the scope of the present invention and the manner in which it achieves the above-noted and other improvements can be obtained by reference to the following detailed description of presently preferred embodiments taken in connection with the accompanying drawings, which are briefly summarized below, and by reference to the appended claims.

DETAILED DESCRIPTION

Figure 1:
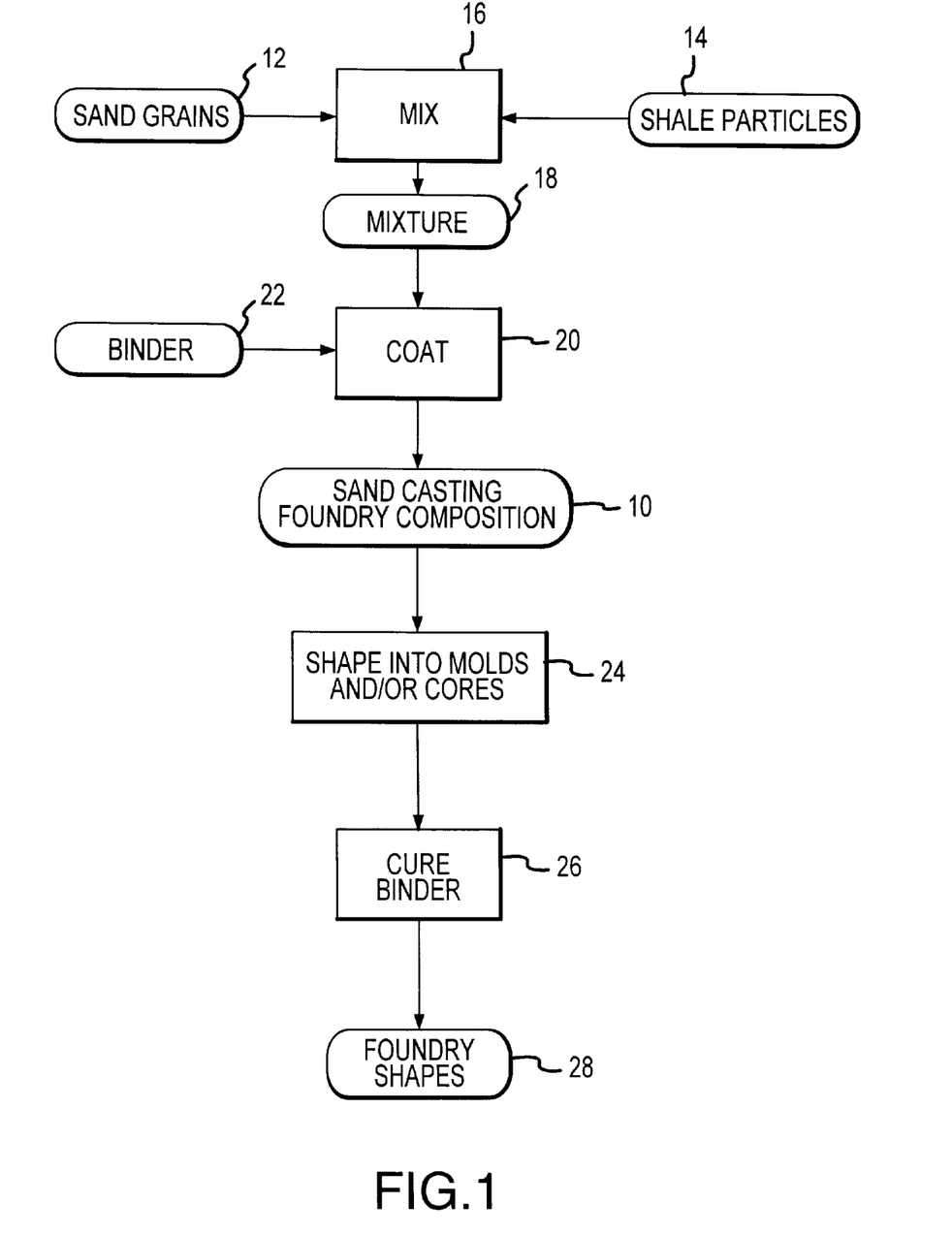
FIG. 1 is a combined diagrammatic illustration of the components of a sand casting foundry composition and a flow chart of the steps of making the sand casting foundry composition and of the steps of using the sand casting foundry composition to produce core and mold foundry shapes, according to the present invention.

A sand casting foundry composition 10 of the present invention, illustrated in FIG. 1, comprises sand grains 12 and particles of shale 14 which are mixed together relatively uniformly at 16 to form a mixture 18. The mixture 18 is then coated at 20 with a binder 22. The resulting sand casting foundry composition 10 is thereafter shaped into mold and core foundry shapes at 24, after which the binder 22 is allowed to cure (set up) at 26 to hold the uniformly mixed sand grains 12 and particles of shale 14 into integral, structurally-sound foundry shapes 28.

Figure 2:
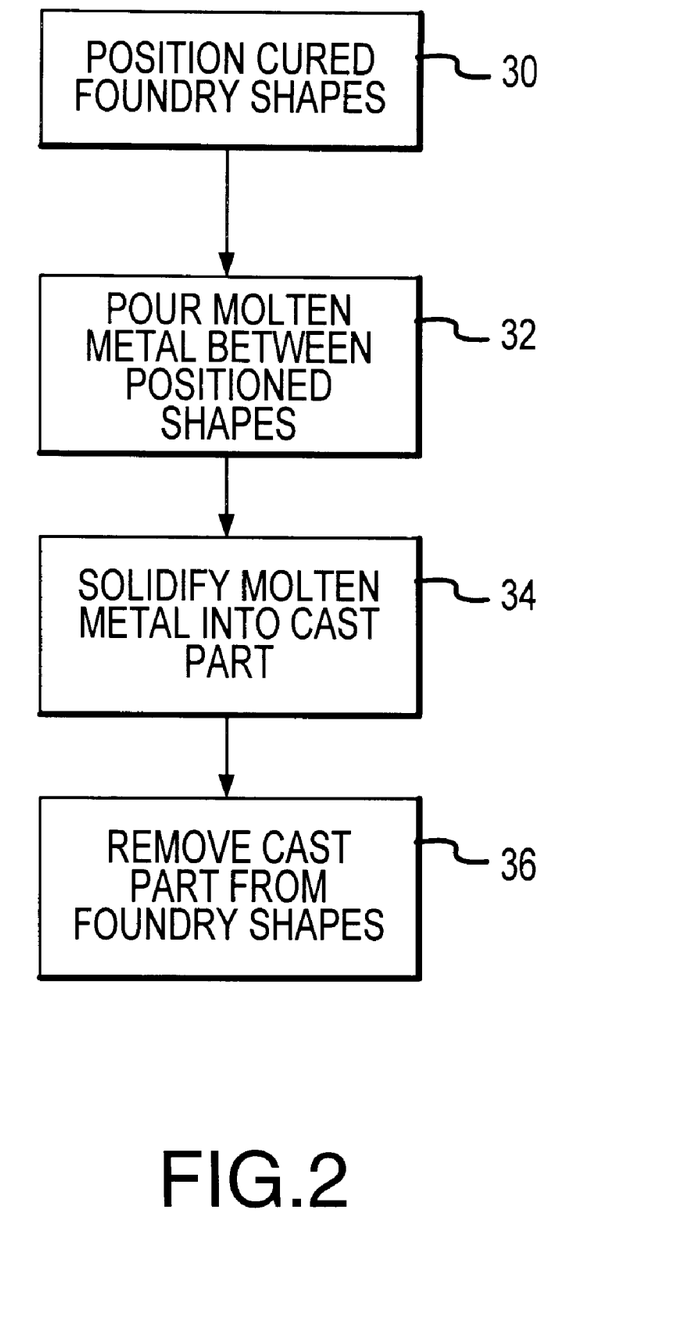
FIG. 2 is a flow chart illustrating the use of the foundry shapes formed as shown in FIG. 1 to produce a cast part.

The foundry shapes 28 formed from the sand casting foundry composition 10 are then used to produce cast metallic parts as shown in FIG. 2. The cured core and mold foundry shapes 28 (FIG. 1) are placed in a desired relationship with respect to one another to define the cast part which will ultimately be produced, as shown at 30. With the foundry shapes in the desired orientation at 30, the molten metal is poured at 32 into the spaces defined by and existing between the positioned foundry shapes. The molten metal is allowed to cool and solidify into the desired shape of the cast part at 34. Once the molten metal has solidified sufficiently, the cast part is removed from the foundry shapes as shown at 36.

The shale particles 14 act as an anti-veining agent in the foundry shapes 28 (FIG. 1) to reduce thermal expansion defects, such as veining, in ferrous and non-ferrous cast metal parts produced. The shale particles 14 (FIG. 1) useful in the present invention must have phyllosilicate mineral components with a crystal structure which has an inherent characteristic and capability to collapse, contract, compress and/or weaken physically and structurally under the influence of the typical temperatures to which the mold and core foundry shapes are subjected by the hot molten metal when the metal part is cast (FIG. 2). Upon collapse of the crystal structure, the shale particles yield volumetric space within the foundry shape sufficient to accept and compensate for the physical expansion of the sand grains in response to the elevated temperature from the molten metal. The net result is a negligible change in volume of the foundry shape, thereby avoiding the mechanical forces which cause the cracks and fissures that result in veining.

The shale particles are obtained from naturally occurring shale. Shale is a fine-grained, detrital, fissile, sedimentary rock composed of silt- and clay-sized particles that contains structurally collapsible crystal phyllosilicate mineral components. The collapsible crystal phyllosilicate mineral components are interspersed, throughout the particle, with a variety of accessory mineral components. As a result of their detrital origin, the mineral composition of shales is dependent on the mineralogy of the parental rocks from whose erosional sediments the shale was formed, as modified by the post depositional geological environment in which the shale developed. For this reason the type and composition of the accessory minerals may vary considerably between shales. Examples of accessory minerals which are frequently found in shales include muscovite and biotite mica, potassium and plagioclase feldspar, and quartz and opal (amorphous silica) both of which may be either of detrital or authigenic (precipitated in situ) origin. Authigenic quartz and opal are of particular importance in shales because they may often act to cement the other mineral components together lending strength and durability to the shale particles while reducing their permeability.

A phyllosilicate is any silicate mineral having a continuous, two-dimensional, sheet-like structure. A subclass of phyllosilicate minerals which are widely found in shales are hydrous phyllosilicates. Clay minerals represent common forms of hydrous phyllosilicates. The phyllosilicate mineral components of the shale particles are principally hydrous phyllosilicates, which includes, but is not limited to, the clay minerals illite, illite-smectite mixed layer clay minerals, chlorite, halloysite, kaolinite, sepiolite, palygorskite, and clays from the group of smectite minerals consisting of montmorillonite, beidelite, nontronite, saponite and hectorite. Where exchangeable cations are associated with the phyllosilicate mineral component of the shale particles, such as with clays of the smectite group, they may be of any type, although sodium or calcium cations, or mixtures of both, are most frequently found.

Shale is also typically fissile. Fissility is a property of being able to be split in a planar fashion to form flake-like particles. The ability to use flake-like particles of shale in the present invention is beneficial. A flake-like shale particle has an ability to bridge between the sand grains in the mixture 18 (FIG. 1) and therefore separate the sand grains from one another, providing volumetric space within the foundry shapes for the sand grains to expand thermally as a result of crystal structural collapse of the phyllosilicate mineral components of the flake-like shale particles. An angular spherical shape of shale particles is satisfactory for use in practicing the present invention, as well as a flake-like shape.

The inherent capability and characteristic to physically contract, collapse and/or weaken under elevated temperature generally results from collapse of the crystal structural of the phyllosilicate mineral components of the shale particles 14 (FIG. 1). The characteristic of crystal structural collapse in phyllosilicates, particularly hydrous phyllosilicate, is known, although the advantageous use of such characteristics for anti-veining agents is not known to have been recognized previously. Most types of phyllosilicate mineral components which occur in shale will undergo crystal structural collapse under the influence of temperatures in a preferred range of about 600° C. to about 700° C., although some of the phyllosilicate mineral components may undergo crystal structural collapse under the influence of temperatures as low as about 450° C. to as high as about 1,000° C.

The temperatures noted are the peak endothermic temperatures, as defined by differential thermal analysis, which are the temperatures at which the crystal structural collapse of the phyllosilicate mineral is complete or maximized. In most cases, the structural collapse will start at lower temperatures and progress as the temperature increases to the peak endothermic temperature. The progressive nature of the crystal structural collapse of the phyllosilicate mineral components of the shale particles coordinates with the expansion in size of the sand grains with increasing temperature, so that the collapse and expansion generally occur on a coincident and counterbalancing basis.

The collapse of the crystal structure of the phyllosilicate mineral components of the shale particles at elevated temperatures may deprive the remaining accessory mineral components of adequate strength to maintain the physical size and shape of the shale particle, in which case the entire shale particle may contract or reduce in physical volumetric size to yield additional space into which the sand grains can expand. In other cases, the remaining accessory mineral components may maintain the size of the shale particle but the strength of the shale particle itself is diminished sufficiently so that the shale particles may be crushed, compacted or deformed with considerably less external force than would otherwise be required if the phyllosilicate mineral components had not undergone crystal structural collapse. The weakened shale particle is more easily reduced in physical size and shape by the application of external forces from the expanding sand grains. In the case of flake-like shale particles, the flake-like structure will more easily crack and break into smaller pieces after having been weakened by the crystal structural collapse of the phyllosilicate mineral components. Instead of bridging the spaces between adjacent sand grains, the flake-like shale particles will break into smaller pieces yielding volumetric space to compensate for the thermal expansion of the sand grains, and the expanding sand grains will occupy the space previously bridged by the shale particles. All of these thermally-induced crystal structural collapse effects may occur coincidentally and to various degrees in the shale particles used.

Figure 3:
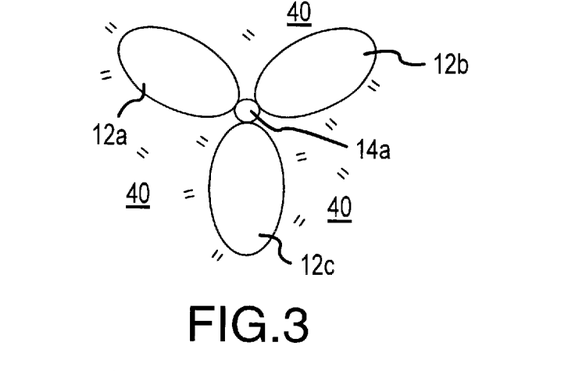
FIG. 3 is an idealized structural illustration of a few randomly oriented sand grains which are separated by a shale particle in the sand casting foundry composition and foundry shape described in FIG. 1.
Figure 4:
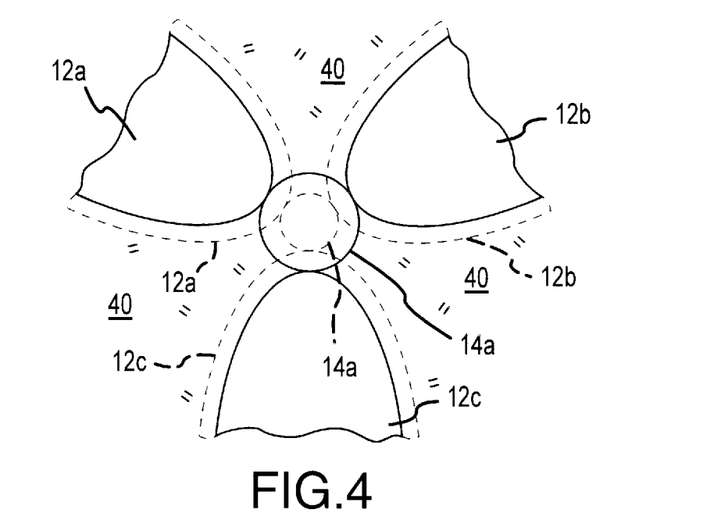
FIG. 4 is an enlarged partial view of FIG. 3, showing in an idealized, magnified manner a compensatory effect of the shale particle as the sand grains expand from the effects of the temperatures to which the foundry shapes are subjected during the casting process shown in FIG. 2.

The manner in which the shale particles are believed to act as an anti-veining agent may be understood by reference to the idealized and generalized illustrations of FIGS. 3 and 4. A single shale particle 14a is used for illustration purposes in FIGS. 3 and 4 to represent the effect of the present invention. A multiplicity of smaller shale particles which occupy approximately the same volumetric space as a single larger shale particle 14a would also have essentially the same effect as is described with respect to the single shale particle 14a. An angular spherical shape of the shale particle 14a has been shown for illustration purposes in FIGS. 3 and 4, but a flake-like shape or shapes of the shale particle or particles would also have essentially the same effect although the flake-like shale particle may more easily break into smaller pieces under the influence of crystal structural collapse, as explained above. FIG. 3 is also intended to represent characteristics and results achieved by the mixing step 16 and coating step 20 illustrated in FIG. 1, again on an idealized and illustrative basis.

Three sand grains 12a, 12b and 12c and a single shale particle 14a are shown in FIG. 3 in one of many different possible types of random orientations in a much larger matrix 40 of the sand grains 12 and shale particles 14 which are held together by the binder 22 (not shown) in the foundry shapes 28 (FIG. 1). The size of a single shale particle 14a is significant relative to the size of the sand grains 12a, 12b and 12c such that the single shale particle 14a separates the sand grains 12a, 12b and 12c from one another and props the sand grains apart. The cured binder (not shown), which coats the sand grains 12a, 12b and 12c and the shale particle 14a, maintains the orientation of the sand grains relative to the shale particles to separate the sand grains from one another. The shale particle 14a has sufficient structural integrity and durability within the matrix 40 to not significantly diminish the tensile strength of the foundry shapes 28 (FIG. 1), as a result of being one of the structural elements of the matrix 40. It is not necessary that all the sand grains within the foundry shapes 28 (FIG. 1) be separated from one another, but it is important that the volumetric concentration of the shale particles and the size of the shale particles be sufficient to provide spaces between a sufficient number of the adjacent sand grains throughout the matrix 40 so that the crystal collapse within shale particles will prevent cracks and fissures in the foundry shapes and thereby create the desired anti-veining effect.

The anti-veining effect achieved by the shale particles may be understood from FIG. 4, by viewing the impact of the shale particle 14a on the three sand grains 12a, 12b and 12c within the matrix 40 when the foundry shape 28 (FIG. 1) is subjected to the elevated temperature caused by the heat of the molten metal poured between the foundry shapes (32, FIG. 2). The relatively high temperature of the molten metal, for example at least about 1,540° C. for iron, causes the crystal structural collapse in the phyllosilicate mineral components of the shale particle, thereby diminishing the exterior physical size of the shale particle 14a or permitting the forces from the thermally-expanded sand grains 12a, 12b and 12c to readily crush, compress, deform or break the shale particle 14a. The diminished size or crushed shape of the shale particle 14a is illustrated in idealized form by the dashed lines, while the solid outline represents the previous dimension of the shale particle 14a prior to thermal collapse or compression. The reduction in physical size, which weakens the shale particle 14a as a result of the crystal structural collapse of the phyllosilicate mineral components, yields or creates additional volumetric space within the matrix 40 as represented by the difference between the dashed lines and the solid outlines of the shale particle 14a.

The relatively high temperature of the molten metal (34, FIG. 2) causes the sand grains 12a, 12b and 12c to expand to an increased physical size illustrated by the dashed lines compared to the solid outline of the sand grains which represent their previous dimension prior to thermal expansion. The sand grains 12a, 12b and 12c expand into the added volumetric space yielded by the shale particle 14a as the crystal structure of the phyllosilicate mineral components undergoes thermally-induced collapse. Thus, the collapsed or more readily compressible shale particle 14a within the matrix 40 of the foundry shape 28 (FIG. 1) yields enough space so that the sand grains 12a, 12b and 12c can expand into that added space. The mechanical forces induced by thermal expansion of each sand grain on the sand grains adjacent to it within the foundry shape is thereby avoided, and as a result, the cracks and fissures in the foundry shapes that allow metal penetration and cause veining in the cast part are avoided.

The rate and amount of expansion of the sand grains is dependent on the amount and type of natural impurities contained within the sand grains. For quartz sand grains, the rate of thermal expansion increases substantially with increases in temperature until temperatures of about 650° C. are reached, and then after about 650° C., further expansion almost levels off with either a slight reduction in physical size or a further increase in expansion of about 10% occurring over the temperature range of from about 650° C. to about 1,000° C. The temperature (650° C.) correlates very closely with the preferred peak endothermic temperature range (about 600° C. to about 700° C.) at which the phyllosilicate mineral components of the shale particles undergo crystal structural collapse, particularly in comparison to the much higher temperatures to which the foundry composition and foundry shapes are subject from the much hotter molten metal when a metal part is cast. Accordingly, the yielding effect achieved by the shale particles occurs on a generally coincident and coordinated temperature basis with the expansion of the sand grains to avoid inducing the mechanical stresses that cause cracks and fissures in the foundry shapes. The degree of thermal expansion for the typical silica sand used in the North American foundry industry is typically in the range of about 1.3 to 1.6% of,the original sand volume, with approximately 90% of that increase having occurred upon reaching temperatures of about 650° C.

The shale particles 14 are distributed throughout the resulting foundry shape 28 in such a manner that the idealized response described in connection with FIGS. 3 and 4 is generally achieved throughout the foundry shape 28. While the orientation of the sand grains and the shale particle throughout the matrix 40 of sand grains and shale particles will not usually take the idealized form shown in FIGS. 3 and 4, but instead will be a variety of different random orientations, the results are substantially similar if the quantity of the shale particles and the size of the shale particles are sufficient to separate a significant number of sand grains so that the collapse, contraction, compression or breakage of the shale particles yields adequate space to accept and compensate for the thermal expansion of the sand grains.

In the present invention, shale particles of adequate size and sufficient volumetric quantity yield a sufficient amount of volume within the foundry shape to accept and compensate for the thermally-induced expansion of the sand grains. The size and quantity of the shale particles required is related in significant part to the amount of void volume or space between the sand grains. A larger amount of void volume between the sand grains will require more and larger shale particles in the mixture 18 (FIG. 1) to obtain the desired anti-veining effect. Although the shale particle size and the amount of shale particles used are interrelated, the effective range of sizes of the shale particles in the mixture 18 (FIG. 1) relates to the size of the average void space or volume between adjacent sand grains. A shale particle which occupies more than the average void space between adjacent sand grains will separate those adjacent sand grains sufficiently so that their thermal expansion will be counterbalanced by the thermal collapse of the shale particle. On the other hand, the anti-veining effect of a larger size shale particle can also be achieved by a multiplicity of smaller sized shale particles which provide the same volumetric separation and collapse capability as a single larger sized shale particle.

Figure 5:
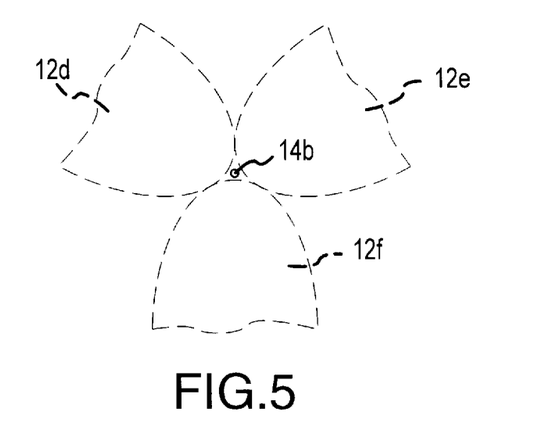
FIG. 5 is an enlarged illustration similar to a portion of FIG. 4 illustrating a negligible anti-veining effect created by, a sand casting foundry composition which utilizes shale particles with an insufficient volumetric concentration and size.

When the shale particles are too small and when there is an insufficient volumetric quantity of shale particles mixed with the sand grains, very little or no significant anti-veining effect will be achieved. FIG. 5 illustrates the lack of significant anti-veining effect created by shale particles which are too small in physical size and of insufficient volumetric quantity. In the idealized illustration of FIG. 5, a single shale particle 14b is again used for illustration purposes, but this is single shale particle 14b could also be replaced by a larger number of relatively smaller shale particles having approximately the same volumetric size as the single shale particle 14b. Again, like FIGS. 3 and 4, an angular spherical shape of the shale particle 14b has been illustrated, but a flake-like shape or shapes of the shale particle or particles would also have essentially the same effect although the flake-like shale particle may be more able to break into smaller pieces under the influence of thermally-induced structural collapse and expansion pressure from the sand grains at the elevated temperatures from the molten metal.

The situation illustrated in FIG. 5 is similar to that illustrated in FIG. 3 except that the shale particle 14b is not sufficiently large to prevent the sand grains 12d, 12e and 12f from touching one another when thermally expanded. The influence of the elevated temperature causes the shale particle 14b to collapse, contract, compress or break, but this reduction in size is of no significant benefit because it does not yield sufficient space into which the sand grains 12d, 12e and 12f can expand. Consequently the thermal expansion of the sand grains causes them to contact one another and to induce the mechanical stress on the foundry shape which causes it to crack or fissure, allowing the molten metal to invade the cracks and fissures to cause the undesirable veining.

Taking into account the size of the shale particles, a volumetric quantity of shale particles which is too small within the foundry composition and the foundry shape is one which does not yield enough space due to thermal crystal structural collapse to accept the thermal expansion of the sand grains. Although shale particles which are too small and of insufficient quantity might nevertheless have some capability to separate the sand grains, the degree of separation is insufficient if the amount of space they yield is insufficient to compensate for the greater amount of thermal expansion of the sand grains. Under such circumstances the quantity and size of the shale particles is insufficient to prevent the sand grains from contacting one another and inducing the mechanical stress in the foundry shape that opens the cracks and fissures which lead to veining in the cast part.

Shale particles that are too large are more difficult to mix and distribute evenly throughout the sand grains in the mixture. Shale particles which are not sufficiently evenly mixed with the sand grains are not effective in preventing the cracks and fissures uniformly throughout the foundry shape. Large numbers of shale particles which are small negatively impact the tensile strength of the foundry shape. Large numbers of smaller shale particles also consume more binder. The effectiveness of the shale particles also depends on the amount of thermal collapse achieved by those particles. Having regard for all of these factors, an acceptable size and volume of shale particles must be generally be determined experimentally and in relation to the type of foundry sand and the degree of thermal collapse of the of shale particles used in the foundry composition.

The sand grains 12 used in the foundry composition 10 (FIG. 1) are conventional foundry sands, typically silica sand, although other useful foundry sands include chromite, zircon and olivine sands. An example of commercially available foundry sand is Wedron 520 available from Fairmount Minerals. Sand grains of Wedron 520 have an American Foundry Society (AFS) size or grains fineness number (GFN) of 59–65, which range corresponds to about the range between U.S. standard (ASTM) No. 30 and No. 140 mesh sizes.

The particles of shale which have proved useful with the Wedron 520 sand have a granular or particulate form having an average particle size of from about 74 micrometers to about 3.4 millimeters. More particularly, the particulate shale may range in size from about 105 micrometers to about 2.0 millimeters. The most effective particle size of the shale is from about 425 micrometers to about 2.0 millimeters. Other sizes of shale particles may be optimal for other sizes of foundry sand, for the reasons noted above.

Particles having an average size of about 74 micrometers or greater are those which are generally retained on the surface of a U.S. standard (ASTM) No. 200 mesh sieve screen. Particles having an average particle size of 105 micrometers or greater are those which are generally retained on a surface of a U.S. standard No. 140 mesh sieve screen. Particles having an average particle size of 425 micrometers or greater are those which are generally retained on a surface of a U.S. standard No. 40 mesh sieve screen. Particles having a nominal size of less than about 2.0 millimeters are those which generally pass through a U.S. standard No. 10 mesh sieve screen. Particles having an average size of less than about 3.4 millimeters are those which generally pass through a U.S. standard No. 6 mesh sieve screen.

In general, to establish and control the anti-veining effect achieved by the shale particles, it is desirable to use predetermined desired sizes of the shale particles so that the desired degree of volumetric space achieved by the physical yielding of the shale particles is controlled by the quantity or weight of the shale particles added to the mixture 18 (FIG. 1). It is therefore preferable to avoid substantial disintegration of the shale particles 14 originally added for mixing at 16 (FIG. 1) into smaller sizes.

The accessory mineral components of the type of shale particles used in the present invention preferably have strength to substantially resist the disintegration of the shale particles from their desired sizes into smaller sizes during the mixing step 16 when forming the foundry composition 10 (FIG. 1). A significant amount of mechanical mixing is usually required to thoroughly and uniformly mix the sand grains with the shale particles to obtain a uniform distribution of the shale particles with the sand grains to achieve the desired anti-veining effect. More mixing is typically required to coat the mixture with the binder 22 at step 20 (FIG. 1) such that substantially all of the sand grains 12 and shale particles in the mixture are adequately coated with binder 22. The strength imparted by the accessory mineral components of the shale prevents the shale particles from disintegrating into smaller particles.

In avoiding disintegration, shale particles have an advantage over less durable minerals which also may exhibit crystal structural collapse in response to elevated temperatures. Less durable minerals are more likely to disintegrate into smaller particles as a result of mixing with the sand grains. If the foundry composition is formed predicated upon particles having a predetermined size, but the mixing disintegrates the desired sized particles into smaller particles, a larger quantity of the particles may have to be added to obtain the desired anti-veining effect. Some of the smaller sized particles formed by disintegration will become ineffective as anti-veining agents for the reasons illustrated by FIG. 5. An additional amount of particles must be added to compensate for the ineffectual volumetric fraction of particles which are too small to contribute to the anti-veining effect. Advantageously more thorough mechanical mixing of the stronger and more durable shale particles with the sand grains is possible without disintegrating significant amounts of the relatively stronger shale particles into smaller particles.

Another substantial advantage of using shale particles that are durable enough to withstand mixing without substantial disintegration into smaller particles is that less liquid resin binder is used to form the foundry composition. Shale particles that have the preferred durability for use in the present invention exhibit substantially reduced porosity and greater impermeability to the liquid resin binders used in foundry applications, in part because of their harder, less porous and less permeable accessory mineral components. The reduced porosity and permeability causes the shale particles to sorb less liquid binder when they are coated 20 (FIG. 1). Instead of being taken up by the shale particles, more binder is available to coat the sand grains to hold the foundry composition into the desired foundry shapes. The greater strength and durability of the shale particles to resist disintegration into smaller shale particles also reduces the amount of binder consumed. More binder will be consumed in coating the exterior surfaces of a relatively larger number of relatively smaller shale particles than in coating the exterior surfaces of a relatively smaller number of relatively larger shale particles. Since the binder is a relatively expensive component of the foundry composition, it is important to minimize the quantity of binder used in the foundry composition.

The binder used in the present invention is preferably a conventional chemical resin used in conventional foundry processes, such as phenolic hot box, phenolic urethane, furan, sodium silicate including ester and carbon dioxide system, polyester binders, acrylic binders, alkaline binders, epoxy binders, and furan warm box systems. A particularly useful binder is a no-bake resin binder system available from Ashland Chemical Company of Covington, Ky. This resin binder system comprises a three part phenolic urethane system which includes a series of binders and a liquid catalyst.

The shale particles useful in the present invention do not significantly degrade the tensile strength of the resulting foundry shapes, in comparison to other anti-veining agents in common use. In general, all anti-veining agents added to a sand-binder mixture will reduce the tensile strength of that mixture compared to the tensile strength of sand and binder by itself. Some anti-veining agents cause significant reductions in tensile strength. The accessory mineral components of the shale particles preferred for use in the present invention have relatively more strength and rigidity than some of the currently-available anti-veining agents, so the resin bound shale particles do not diminish the strength of the foundry shape to an unacceptable amount. Since the foundry shapes might be subjected to significant movement and positioning to obtain the proper orientation for casting the part (step 30, FIG. 2), the foundry shapes should have sufficient tensile strength to withstand such movement before they are used as well as sufficient tensile strength to confine the molten metal during pouring and cooling of the metal. Additionally, the less permeable nature of the shale particles preferred for use in the present invention causes them to sorb less resin binder than with many other anti-veining agents. This allows more binder to be available for binding the foundry composition in the foundry shape, without the need to add additional binder, resulting in increased tensile strength of the cured foundry shape, when compared with foundry shapes made using other anti-veining agents.

The moisture content of the shale articles can also affect the anti-veining capability. If the moisture content of the shale particles is too high, the foundry shape can potentially crack or fissure because of the excessive amount of steam created by vaporization of the moisture by the heat of the molten metal. It is therefore believed that the incidence of veining decreases with decreasing moisture levels. Further, many of the chemical binders used to produce this type of foundry shape are not compatible with water. When using these binders the moisture content of the foundry composition is inversely related to the tensile strengths of the cured foundry shape. Therefore, it is necessary to keep the moisture level of the shale suitably low in order to maximize the tensile strength of the cured foundry shape of the present invention. From a practical standpoint, the shale particles will typically have a moisture level of from 0.1% to about 12%. Preferably the moisture content of the shale particles used in present invention should be within the range of about 3 to 5% on a weight basis, with an optimal target moisture level of about 4%.

Shale particles which contain natural carbon may beneficially affect the cast part. The natural carbon in the shale particles may transfer from the shale particles to the surface of the molten metal at the elevated temperature and create a lustrous finish on the surface of the cast part. To obtain this effect, the shale particles are preferably obtained from a group consisting of carboniferous shales, tar shales and oil shales, all of which contain natural carbon.

A method of making the sand casting foundry composition 10 is illustrated by FIG. 1. The method of making the foundry composition comprises the step 16 of mixing the sand grains 12 and the shale particles 14 into the mixture 18. The mixture 18 contains a relatively uniform distribution of the shale particles 14 throughout the mass of sand grains 12. The mixing step 16 may be accomplished by using any conventional mixing process. Thereafter, at step 20, the binder is added to the mixture 18. The binder is added so as to uniformly coat the sand grains and the uniformly distributed shale particles within the mixture 18. The coating step 20 is preferably executed by employing the conventional techniques used for mixing conventional foundry resin-type binders with foundry sand.

The order of addition of the shale particles to the foundry composition is important in securing the anti-veining function of the shale particles within the foundry shape. The sand grains are preferably mixed with the shale particles first and then the foundry resin binder is added so that the resin coats the surface of the sand grains and the shale particles and provides a sand casting foundry composition with the shale particles dispersed throughout. Adding the binder to the mixture of uniformly distributed shale particles and sand grains does not disturb the uniformity. Adding the binder to the existing mixture of sand grains and shale particles also reduces consumption of the binder because more binder is distributed uniformly over the sand grains and less binder is available to be sorbed by the shale particles within the mixture, compared to the case where the binder was added to the shale particles first and then the binder-coated shale particles were attempted to be mixed with the sand grains. Adding the binder to the shale particles first would provide more of an opportunity for the binder to be sorbed by the shale particles rather than to be distributed over the sand grains. Coating the sand grains with the binder first and attempting to uniformly mix in the shale particles would inhibit the uniform distribution of the shale particle and would require an excessive amount of mixing to obtain the uniform mixture.

The sand grains 12 typically constitute about 85% to about 98.5% of the foundry composition 10 by weight. The shale particles 14 typically constitute from about 1% to about 10% of the foundry composition 10 by weight. More preferably, the shale particles may be present in an amount from about 1% to 7% by weight. Conventional foundry resin-type binder 22 will be added in an amount from about 0.5 percent to about 5.0 percent by weight.

The sand casting foundry composition 10 is formed at step 24 into the foundry shapes 28 as shown in FIG. 1. Depending upon the type of binder 22 added to the foundry composition 10, curing may start to proceed immediately with the coating step 20, in which case, it is necessary to shape the foundry composition 10 into the core foundry shapes and mold foundry shapes on a relatively immediate basis. In other cases, the addition of a physical property or a chemical constituent of binder may be required after the foundry composition 10 has been formed to cause the binder 22 coated at step 20 to set up or cure as shown at step 26. In any event, the desired number and type of core and mold foundry shapes are created by forming the foundry composition 10 into those desired shapes before the foundry composition 10 cures, as shown at 24. Thereafter, once the foundry composition 10 is in the desired shape, the binder 22 is set up or cured as shown at step 26.

The curing which occurs at step 24 (FIG. 1) is achieved by causing or allowing the binder 22 coated at step 20 (FIG. 1) to set up to hold the sand grains and shale particles in the desired foundry shapes. In this sense, curing includes permitting the binder 22 to become effective for setting up without further influence after the foundry composition has been shaped into the foundry shapes at step 24, and also includes adding physical properties or chemical constituents to the foundry composition before or after shaping the foundry composition into the foundry shapes to cause the binder 22 added to the foundry composition 10 at step 20 to set up. If the type of binder 22 added at step 20 is one which will commence curing only in response to the addition of another chemical constituent, e.g. a catalyst, or in response to the addition of a physical property, e.g. the application of heat or pressure, and that chemical constituent or physical property can be added at a later time so that it permeates the complete shape of the mold or core foundry shape, the step 26 will involve adding the additional chemical constituent or physical property which causes the binder to set up. If the type of binder 22 is one which commences curing once coated at step 20, the cure step 26 will progress without further action as an inherent result of the coating step 20.

Once the binder has cured at step 26, the shapes of the molds and cores established at 24 is fixed, and the foundry shapes 28 are completed. The completed foundry shapes 28 have sufficient tensile strength and integrity so that they may be moved and positioned for use in casting the metal part as has previously been described in connection with FIG. 2. Of course, sometimes casting the metal parts may require only a mold foundry shape and not a core foundry shape, or vice versa.

EXAMPLES

Different silica sand-based sand casting foundry compositions were prepared for the purpose of evaluating shale particles as anti-veining agents and comparing the anti-veining effects of shale particles to other well-known anti-veining agents. Effectiveness in preventing veining and strength of tensile properties in the resulting foundry shapes were evaluated. A widely used anti-veining agent used for comparison to the shale particles was "Veinseal" (trademark), a lithia and iron oxide based anti-veining agent which is a widely used and generally accepted as a leading anti-veining agent in the sand casting foundry industry at the present time. The "Veinseal" product is manufactured by Ashland Chemical Company.

Identical silica sand-based compositions were prepared utilizing the anti-veining agents noted in the following Tables. Test samples were prepared by blending Wedron 520 silica sand grains and the anti-veining agent in a mixer for 30 seconds. The addition of the three part Ashland binder system was completed according to the manufacturer's recommendations.

Tables 1 and 2 summarize the effectiveness of shale particle and "Veinseal" anti-veining additives. Table 1 is directed to test results for sand cores coated with EZ Kote Graphite Coating.

TABLE 1

Comparison Of Anti-Veining Agents

| Material | Control | Example 1 | Example 2 | Example 3 | Example 4 | Example 5 |
|---|---|---|---|---|---|---|
| Coated Sand Cores | | | | | | |
| Ashland (Part 1) Pepset XI 1000 | 10 | 10 | 10 | 10 | 10 | 10 |
| Ashland (Part 2) Pepset XII 2000 | 8 | 8 | 8 | 8 | 8 | 8 |
| Ashland Catalyst 3502 | 0.5 | 0.5 | 0.5 | 0.5 | 0.5 | 0.5 |
| Sand | 2000 | 1900 | 1900 | 1900 | 1940 | 1860 |
| Shale (#40 mesh) | — | 100 | — | 100 | 60 | 140 |
| Veinseal | — | — | 100 | — | — | — |
| Veining (Number Observed) | | | | | | |
| Horizontal | 1 | None | None | None | 1 | None |
| Vertical | 2 | None | None | None | 2 | None |

Examples 1 and 2 illustrate the effectiveness of shale particles as anti-veining agents, as compared to the commercially available "Veinseal" anti-veining agent. Examples 3–5 illustrate the effect of shale concentration on veining.

Graphite coatings, such as EZ Kote, are known to reduce the number and severity of veins and other surface defects in castings by providing a more uniform core surface. In order to create a worst-case condition a series of uncoated cores was also prepared and tested. Table 2 is directed to test results for uncoated sand cores.

TABLE 2

Comparison Of Anti-Veining Agents

| Material | Control | Example 6 |
|---|---|---|
| Uncoated Sand Cores | | |
| Ashland (Part 1) Pepset XI 1000 | 10 | 10 |
| Ashland (Part 2) Pepset XII 2000 | 8 | 8 |
| Ashland Catalyst 3502 | 0.5 | 0.5 |

TABLE 2-continued

Comparison Of Anti-Veining Agents

| Material | Control | Example 6 |
|---|---|---|
| Sand | 2000 | 1900 |
| Shale | — | 100 |
| Veining (Number Observed) | | |
| Horizontal | 2 | None |
| Vertical | 4 | 1 (minor) |

The tensile properties of various sand casting foundry compositions were calculated based on retained tensile strength in reference to the control material as indicated in Table 3 below. Tensile strength is important to maintain the desired shape of the mold or core before and during casting.

TABLE 3

Comparison Of Anti-Veining Agents

Retained Tensile Properties of Anti-Veining Foundry Compositions
Formulation of Prepared Mixtures (wt) (g)

| Material | Control | Example 7 | Example 8 | Example 9 | Example 10 | Example 11 |
|---|---|---|---|---|---|---|
| Uncoated Sand Cores | | | | | | |
| Ashland (Part 1) Pepset XI 1000 | 10 | 10 | 10 | 10 | 10 | 10 |
| Ashland (Part 2) Pepset XII 2000 | 8 | 8 | 8 | 8 | 8 | 10 |
| Catalyst | 0.5 | 0.5 | 0.5 | 0.5 | 0.5 | 0.5 |
| Sand | 2000 | 1970 | 1970 | 1970 | 1900 | 1860 |
| Dextrin | — | 30 | 20 | 10 | — | — |
| Shale (#40 mesh) | — | — | — | — | 100 | 140 |
| Relative Tensile Strength | 100% | 34% | 7% | 1% | 43% | 63% |

TABLE 3-continued

Comparison Of Anti-Veining Agents

Retained Tensile Properties of
Anti-Veining Foundry Compositions
Formulation of Prepared Mixtures (wt) (g)

| Material | Control | Example 7 | Example 8 | Example 9 | Example 10 | Example 11 |
|---|---|---|---|---|---|---|
| Veining (# Observed) | | | | | | |
| Horizontal | 3 | 2 | 2 | 2 | 1 (minor) | 0 |
| Vertical | 4 | 2 | 2 | 0 | 0 | 0 |

Table 4 illustrates additional examples of the present invention.

TABLE 4

Comparison Of Anti-Veining Agents

Formula (wt) (g)

| Material | Control | Example 12 (Comparative) | Example 13 |
|---|---|---|---|
| Uncoated Sand Cores | | | |
| Ashland (Part 1) Pepset XI 1000 | 10 | 10 | 10 |
| Ashland (Part 2) Pepset XII 2000 | 8 | 8 | 8 |
| Ashland Catalyst 3502 | 0.5 | 0.5 | 0.5 |
| Sand | 2000 | 1900 | 1900 |
| Shale (#40 mesh) | — | — | 100 |
| Veinseal | — | 100 | — |
| Veining (Number Observed) | | | |
| Horizontal | 3 | None | 0 |
| Vertical | 4 | None | 1 (minor) |

Other anti-veining agents may also be incorporated along with the anti-veining shale particles in the sand casting foundry composition of the present invention. Such additional anti-veining agents may provide further and additional benefits particular to those types of anti-veining agents which, in combination with the anti-veining shale particles, result in better resistance to veining when forming the cast part. For example, lithia and iron oxide anti-veining agents may be particularly useful in conjunction with the anti-veining effect obtained from shale particles.

Mixing the shale particles with the sand grains in a sand casting foundry composition substantially improves the performance of the foundry shapes in producing the cast part. The anti-veining ability of the shale particles in the foundry shape can eliminate or substantially reduce the extent and incidence of veining in the cast part, and correspondingly can eliminate or reduce the need for surface grinding to remove undesirable veins projecting from the cast part. Eliminating veining by use of the shale particles in the foundry composition and foundry shapes can significantly reduce the cost of producing the cast part. Furthermore, because shale is considerably less expensive than some other anti-veining additives, like lithia-containing anti-veining agents, the cost of producing the cast part may actually be diminished.

A presently preferred embodiment of the present invention and many of its improvements have been described with a degree of particularity. This description is a preferred example of implementing the invention, and is not necessarily intended to limit the scope of the invention. The scope of the invention is defined by the following claims.

I claim:

1. A foundry composition which reduces thermal defects that cause veining in metal parts cast from sand casting foundry shapes formed from the foundry composition, comprising:
    a plurality of foundry sand grains;
    a plurality of shale particles substantially uniformly distributed among the sand grains to form a matrix of sand grains and shale particles; and
    a curable binder coating the sand grains and the shale particles to hold the sand grains and shale particles within the matrix in a predetermined position upon curing; and wherein the shale particles include mineral components having an inherent characteristic of crystal structural collapse upon exposure to a temperature to which the foundry shapes are subjected from molten metal when casting the metal part.

2. A foundry composition as defined in claim 1, wherein:
    the shale particles are weakened by the crystal structural collapse of the mineral components to achieve at least one of a reduction in physical size of the shale particles, disintegration of the shale particles into smaller physical sizes or a reduced capacity to resist compression and deformation from external forces.

3. A foundry composition as defined in claim 2, wherein:
    the mineral components of the shale particles undergo crystal structural collapse at peak endothermic temperatures in the range of about 600° C. to about 700° C.

4. A foundry composition as defined in claim 2, wherein:
    the sand grains have an inherent characteristic of expansion in physical size upon exposure to a temperature to which the foundry shapes are subjected from molten metal when casting the part; and
    at least one of the reduction in physical size of the shale particles, the disintegration of the shale particles into smaller physical sizes or compression and deformation of the shale particles occurs from expansion in physical size of the sand grains.

5. A foundry composition as defined in claim 4, wherein:
    the temperature at which the mineral components of the shale particles experience crystal structural collapse is within a range of temperatures similar to those at which the sand grains will have achieved their maximum rate of thermal expansion and most of their physical thermal expansion.

6. A foundry composition as defined in claim 5, wherein:
    the temperature at which the sand grains experience their maximum rate of thermal expansion and most of their physical thermal expansion is approximately 650° C.

7. A foundry composition as defined in claim 1, wherein:
the sand grains have an inherent characteristic of expansion in physical size upon exposure to a temperature to which the foundry shapes are subjected from molten metal when casting the metal part; and
the crystal structural collapse of the shale particles yields sufficient volumetric space within the matrix to compensate for an increase in volume created by the thermal expansion of the sand grains at the temperature to which the foundry shapes are subjected from the molten metal when casting the metal part.

8. A foundry composition as defined in claim 7, wherein:
a volumetric quantity of the shale particles and a distribution of shale particles within the matrix yield volumetric space distributed within the matrix resulting from the crystal structural collapse which is sufficient to accept an increase in physical dimension of the sand grains from thermal expansion at the temperature to which the foundry shapes are subjected from molten metal when casting the metal part.

9. A foundry composition as defined in claim 7, wherein:
a volumetric quantity of the shale particles and a distribution of the shale particles within the matrix and a size of the shale particles yield volumetric space throughout the matrix which approximately counterbalances an amount of expansion in physical dimension of the sand grains throughout the matrix at the temperature to which the foundry shapes are subjected from molten metal when casting the metal part.

10. A foundry composition as defined in claim 1, wherein:
a volumetric quantity of the shale particles and a size of the shale particles within the matrix separate a sufficient number of the sand grains from adjoining sand grains within the matrix to yield sufficient volumetric space within the matrix at the temperature at which crystal structural collapse occurs to compensate for an increase in volume created by thermal expansion of the sand grains upon exposure to the temperature to which the foundry shapes are subjected from the molten metal when casting the metal part.

11. A foundry composition as defined in claim 1, wherein:
the shale particles also include accessory mineral components;
the mineral components of the shale particles which undergo crystal structural collapse are distributed among the accessory mineral components within the shale particles; and
the mineral components of the shale particles which undergo crystal structural collapse are phyllosilicates.

12. A foundry composition as defined in claim 11, wherein:
the phyllosilicates are hydrous phyllosilicates.

13. A foundry composition as defined in claim 12, wherein:
the hydrous phyllosilicates are clay minerals selected from the group consisting of montmorillonite, beidelite, nontronite, saponite, hectorite, illite, illite-smectite mixed layer clay minerals, sepiolite, palygorskite, kaolinite, chlorite and hallyosite.

14. A foundry composition as defined in claim 1, wherein:
the shale particles are predominantly of a flake-like shape.

15. A foundry composition as defined in claim 1, wherein:
the shale particles contain natural carbon and are obtained from a group consisting of carboniferous shales, tar shales and oil shales.

16. A method of making a foundry composition which reduces thermal defects that cause veining in metal parts cast from sand casting foundry shapes formed from the foundry composition, comprising:
mixing a plurality of foundry sand grains and a plurality of shale particles to form a mixture in which the shale particles are substantially uniformly distributed among the sand grains in the mixture;
coating the mixture of sand grains and shale particles with a binder sufficient to hold the mixture of sand grains and shale particles in the foundry shapes after the binder is cured; and selecting the shale particles with mineral components having an inherent characteristic of crystal structural collapse upon exposure to a temperature to which the foundry shapes are subjected from molten metal when casting the metal part.

17. A method as defined in claim 16, further comprising:
selecting the shale particles with mineral components that are weakened by the crystal structural collapse upon exposure to the temperature to which the foundry shapes are subjected from molten metal when casting the metal part to achieve at least one of a reduction in physical size of the shale particles, disintegration of the shale particles into smaller physical sizes or a reduced capacity to resist compression and deformation from external forces.

18. A method as defined in claim 17, further comprising:
distributing the shale particles within the mixture by mixing the shale particles and the sand grains;
selecting shale particles of a predetermined size for distribution within the mixture;
selecting a predetermined volumetric quantity of shale particles at the predetermined sizes for distribution within the mixture; and
selecting the predetermined sizes and volumetric quantities and distributing the shale particles to yield volumetric space within the foundry shape resulting from crystal structural collapse which is sufficient to accept an increase in physical dimension of the sand grains from thermal expansion at the temperature to which the foundry shapes are subjected from molten metal when casting the metal part.

19. A method as defined in claim 16, further comprising:
selecting the shale particles to have mineral components which undergo crystal structural collapse when subjected to peak endothermic temperatures in a range of about 600° C. to about 700° C.

20. A method as defined in claim 19, further comprising:
selecting the sand grains to have a characteristic of achieving their maximum rate of thermal expansion and most of their physical thermal expansion at temperatures of about 650° C.

21. A method as defined in claim 16, further comprising:
selecting the sand grains which have a characteristic of having achieved their maximum rate of thermal expansion and most of their physical thermal expansion at approximately a peak endothermic temperature at which the mineral components of the shale particles undergo crystal structural collapse.

22. A method as defined in claim 16, further comprising:
selecting shale particles of a volumetric quantity and with a predetermined size to separate a sufficient number of the sand grains from adjoining sand grains within the matrix to yield sufficient volumetric space within the foundry shapes at the temperature at which crystal structural collapse occurs to compensate for an increase in volume created by thermal expansion of the sand grains upon exposure to the temperature to which the foundry shapes are subjected from the molten metal when casting the metal part.

23. A method as defined in claim 16, further comprising:
selecting the shale particles as originating from a group consisting of carboniferous shales, tar shales and oil shales.

24. A method as defined in claim 16, further comprising:
selecting the shale particles to have phyllosilicates as the mineral components which undergo crystal structural collapse.

25. A method as defined in claim 24, further comprising:
selecting the shale particles to have hydrous phyllosilicates as the mineral components which undergo crystal structural collapse.

26. A method as defined in claim 25, further comprising:
selecting the shale particles to have the hydrous phyllosilicate mineral components from among a group of clay minerals consisting of montmorillonite, beidelite, nontronite, saponite, hectorite, illite, illite-smectite mixed layer clay minerals, sepiolite, palygorskite, kaolinite, chlorite or hallyosite.

27. A method as defined in claim 25, further comprising:
selecting the shale particles to have the mineral components which undergo crystal structural collapse from a group of naturally-occurring clay minerals.

28. A method as defined in claim 16, further comprising:
selecting the shale particles to have a flake-like shape.

29. A method as defined in claim 16, further comprising:
using a resin chemical binder to coat the mixture.

30. A method of making a foundry shape which reduces thermal defects that cause veining in metal parts cast from the foundry shapes, comprising:
mixing a plurality of foundry sand grains with a plurality of shale particles to form a mixture in which the shale particles are substantially uniformly distributed among the sand grains in the mixture;
coating the mixture of sand grains and the shale particles with a binder sufficient to hold the sand grains and shale particles in position relative to one another after the binder has cured;
shaping the binder-coated mixture into a predetermined configuration defining the foundry shape;
curing the binder while maintaining the predetermined configuration to establish the foundry shape; and selecting the shale particles with mineral components having an inherent characteristic of crystal structural collapse upon exposure to a temperature to which the foundry shapes are subjected from molten metal when casting the metal part.

31. A method as defined in claim 30, further comprising:
selecting the shale particles with mineral components that are weakened by the crystal structural collapse upon exposure to the temperature to which the foundry shapes are subjected from molten metal when casting the metal part to achieve at least one of a reduction in physical size of the shale particles, disintegration of the shale particles into smaller physical sizes or a reduced capacity to resist compression and deformation from external forces.

32. A method as defined in claim 31, further comprising:
distributing the shale particles within the mixture by mixing the shale particles with the sand grains;
selecting shale particles of a predetermined size for distribution within the mixture;
selecting a predetermined volumetric quantity of shale particles at the predetermined sizes for distribution within the mixture; and
selecting the predetermined sizes and volumetric quantities and distributing the shale particles to yield volumetric space within the foundry shapes resulting from crystal structural collapse which is sufficient to accept an increase in physical dimension of the sand grains from thermal expansion at the temperature to which the foundry shapes are subjected from molten metal when casting the metal part.

33. A method as defined in claim 31, further comprising:
selecting the predetermined sizes of the shale particles to separate a sufficient number of the sand grains from adjoining sand grains within the foundry shapes to yield sufficient volumetric space within the foundry shapes at the temperature at which crystal structural collapse occurs to compensate for an increase in volume created by thermal expansion of the sand grains upon exposure to the temperature to which the foundry shapes are subjected from the molten metal when casting the metal part.

34. A method as defined in claim 30, further comprising:
selecting shale particles having a flake-like shape for mixing with the sand grains in the predetermined configuration.

35. A method as defined in claim 30, further comprising:
selecting a resin chemical binder to coat the mixture.

36. A method of casting a metal part using core and mold foundry shapes formed by the method defined in claim 30, comprising:
positioning the core and mold foundry shapes relative to one another to define the metal part to be cast;
pouring molten metal between the core and mold foundry shapes; and
solidifying the molten metal while confined between the core and mold foundry shapes.

37. A method as defined in claim 36, further comprising:
removing the cast part from the core and mold foundry shapes after the metal has solidified.

38. A metal part substantially free of veining cast by using a foundry shape formed from the foundry composition of claim 1.

* * * * *